US 7,625,974 B2

United States Patent
Jozokos et al.

(10) Patent No.: US 7,625,974 B2
(45) Date of Patent: Dec. 1, 2009

(54) HIGHLY FILLED UNSATURATED FLUOROPOLYMER COMPOSITIONS FOR CABLES

(75) Inventors: Mark A. Jozokos, Pelham, NH (US); Yevgeniy I. Globus, Littleton, MA (US)

(73) Assignee: AlphaGary Corporation, Leominster, MA (US)

( * ) Notice: Subject to any disclaimer, the term of this patent is extended or adjusted under 35 U.S.C. 154(b) by 54 days.

(21) Appl. No.: 11/540,182

(22) Filed: Sep. 29, 2006

(65) Prior Publication Data

US 2007/0078209 A1    Apr. 5, 2007

Related U.S. Application Data

(60) Provisional application No. 60/722,289, filed on Sep. 30, 2005.

(51) Int. Cl.
*D06M 15/277* (2006.01)
(52) U.S. Cl. ............... 524/545; 524/406; 524/413; 524/437; 524/544; 524/546; 525/199
(58) Field of Classification Search ............... 524/544; 525/199
See application file for complete search history.

(56) References Cited

U.S. PATENT DOCUMENTS 6,054,538 A    4/2000   Thulliez et al. ............ 525/191
6,797,760 B1*  9/2004   Ebrahimian et al. ......... 524/445
2005/0161856 A1  7/2005   Globus et al. .......... 264/171.14
2005/0173674 A1  8/2005   Globus et al. ............ 252/301.5
2007/0015874 A1*  1/2007   Globus et al. ............... 525/199

FOREIGN PATENT DOCUMENTS

WO    WO 2005/073984    8/2005

OTHER PUBLICATIONS

International Preliminary Report on Patentability corresponding to International Application Serial No. PCT/ US2006/038065, mailed Apr. 10, 2008, 7 pages.

* cited by examiner

*Primary Examiner*—Marc S. Zimmer
*Assistant Examiner*—Nicole M Buie
(74) *Attorney, Agent, or Firm*—McAndrews, Held & Malloy, Ltd.

(57) ABSTRACT

A non-dripping, flame retardant, fluoropolymeric composition comprising: (a) a fluoropolymeric base polymer; (b) at least one char forming agent; and (c) a compatibilizer agent. The fluoropolymeric base polymer is preferably selected from the group consisting of PVDF (polyvinylidene fluoride), ECTFE, poly-ethylene chlorotrifluoroethylene, and ETFE poly-ethylene tetrafluoroethylene. Such compositions are especially useful for appliance wire, aerospace/military wire, cable raceways, blown fiber tubes, fire alarm cables, circuit integrity cables, fiber optic distribution cables & breakout components, heat tracing cable jacket, stage lighting cable, industrial cable, shipboard cable (military & passenger), shielded cable jackets.

19 Claims, No Drawings

HIGHLY FILLED UNSATURATED FLUOROPOLYMER COMPOSITIONS FOR CABLES

CROSS REFERENCES TO RELATED APPLICATIONS

This application claims priority to U.S. Provisional Patent Application No. 60/722,289, filed 30 Sep. 2005 and entitled "Highly Filled Unsaturated Fluoropolymer Compositions for Cables." The entire contents of the above application are incorporated herein by reference in their entirety.

FIELD OF THE INVENTION

The present invention relates to compositions based upon fluoropolymer blends and alloys as well as alloys with low smoke generation, low corrosivity, low heat release, flame retardancy and favorable char integrity with non-dripping characteristics.

BACKGROUND OF THE INVENTION

Blending of two or more polymers is a common practice, the objective being to produce a composition having improved mechanical, rheological, and/or degradative properties compared to the individual polymers. Blending can be an effective way to customize a composition, providing properties which may not be available in a single known polymer, or which would require the time-consuming and expensive development of a new polymer.

A virtually infinite number of polymer blends is theoretically possible, but not all polymer blends result in compositions with desirable properties. If the component polymers are incompatible, the resulting blend often has inferior properties. This can especially be the case for blends involving fluoropolymers. Generally, incompatibility is the rule, and compatibility is the exception.

Compatability is often established by the observation of mechanical integrity under the intended conditions of use of a composite or an immiscible polymer blend. Compatibilizers, which are usually block or graft copolymers having segments in common with the main polymer components of the two polymers being blended, can be used to improve the chances of obtaining a compatible blend. But even the use of a compatibilizer does not assure success. Most examples of successful use of compatibilizers involve polyolefin blends.

Fluoroplastics are unique among polymers, offering performance characteristics unobtainable with most other polymers. Some commercially available fluoropolymers include polytetrafluoroethylene (PTFE), fluorinated ethylene-propylene copolymer (FEP), perfluoroalkoxy resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), and polyvinylfluoride (PVF), among others. Some fluoroplastics such as PTFE are completely fluorinated, while others such as ETFE or PVDF are only partially fluorinated. Typically, fluoroplastics are characterized by high melting points and low glass transition temperatures, enabling them to be advantageously used over a wide temperature range, such as from well below 0° C. to +260° C. Other desirable properties of fluoroplastics include their excellent solvent resistance, electrical insulative properties, low coefficient of friction, low flammability, low gas permeability, and high inertness and stability. The selection of commercially available fluoroplastics is typically more limited than for non-fluorinated polymers, because options regarding both the choice of fluorinated monomer and type of polymerization chemistry are much more limited. Thus, it is desirable to develop novel blends of fluoroplastics having improved properties.

It is known that the incorporation of nanocomposite additives into fluoroelastomeric compositions can improve some properties of the compositions, particularly combustion properties including non-dripping characteristics. Known nanocomposites that are suitable for incorporation into these compositions are preferably by montmorillonites (the main fraction of the clay mineral bentonite), which are layered alumino-silicate or magnesium-silicate materials whose individual platelets measure on the order of one micron diameter, giving them an aspect ratio of about 1000:1. It is this morphology that leads to increased barrier properties to moisture, resistance of the composition to deformation, resistance to whitening or blooming, improved mechanical strength, sizeable drop in heat release rate and smoke properties, improved flame retardancy and char integrity of the polymer compositions. The nanocomposite additives can be chemically modified to increase the hydrophobicity of their surfaces, thereby enhancing their fire performance effectiveness.

It is also known that blending or alloying fluoroelastomeric compositions with suitable olefinic or polyvinylchloride (PVC) polymers improves the flexibility, electrical properties, and manufacturing costs of the resulting blend or alloy. Suitable polymers to make the blends and alloys of these compositions include: polytetrafluoroethylene (PTFE) fluorocarbons, fluorinated ethylene/propylene (FEP) fluorocarbons, perfluoroalkoxy (PFA) fluorocarbons, ethylene tetrafluoroethylene (ETFE) fluoropolymers, polyvinylidene (PVDF) fluoropolymers, ethylene chlorotrifluoroethylene (ECTFE) fluoropolymers, fluoro-chlorinated homopolymers, copolymers and terpolymers, very low density polyethylene (VLDPE), low density polyethylene (LDPE), linear low density polyethylene (LLDPE), high density polyethylene (HDPE), polypropylene (PP), ethylene propylene copolymer or rubber (EPR), ethyl vinyl acetate (EVA), ethylene ethyl acrylate (EEA), ethylene methyl acrylate (EMA), ethylene butyl acrylate (EBA), and ethylene-based homopolymers, copolymers and terpolymers, and PVC-based homopolymers, copolymers and terpolymers.

Ebrahimian, et al, U.S. Pat. No. 6,797,760, discloses a non-dripping, flame retardant, fluoropolymeric insulative composition that comprises: (a) a fluoropolymeric base polymer; and (b) a nanoclay additive. The preferred nanoclay additive is selected from the group consisting of synthetic silicate montmorillonites, natural layered silicate montmorillonites and a layered alumna-silicate. Such compositions are especially useful for coating wires and conductors employed in high-speed telecommunication data transmission cables. A method for preparing an exfoliated thermoplastic elastomer blend of a fluoropolymer and a nanocomposite comprising dynamically mixing said fluoropolymer and said nanocomposite in a ratio of from about 99:1 to about 50:50 parts by weight, respectively. While the previous compositions were suitable for plenum rated fiber optic cable they are unsuitable for limited combustible applications because of their high heat of combustion values.

Known prior art fluoropolymer compositions have been filled to about 20%- about 60% by weight. There is a need for continued development in the field to produce alternative compositions with desired function specific characteristics at lower costs.

SUMMARY OF THE INVENTION

The present compositions can be melt processed to form extruded articles. The associated manufacturing process and the resulting articles are also disclosed.

The composition ingredients includes a fluoropolymeric base polymer; a char forming agent; and a compatibilizer agent. The fluoropolymeric base polymer is preferably selected from the group consisting of PVDF (polyvinylidene fluoride), ECTFE (poly-ethylene chlorotrifluoroethylene), and ETFE (poly-ethylene tetrafluoroethylene). The fluoropolymer base is in the range of about 33.3 to about 90 wt % of the composition.

The composition also has at least one char forming agent or filler. Generally, a more highly filled polymer produces a stronger char with more structural integrity. The filler may be selected from the group consisting of metal hydrates, silicon oxides, metal oxides, carbonates, talcs, clays, nanoclays, molybdates, borates, calcium metaborate, stannates, carbon blacks, silicates, and phosphates. The char forming agent or filler is in the range of about 10 to about 66.6 wt % of the composition. The composition also includes a compatibilizer to promote interfacial adhesion or interstitial bonding and a higher level of dispersion during mixing. The compatibilizer is in the range of about 0.1 to about 5 wt % of the composition. In these ranges, at the bottom end of the range, the material is generally smooth in appearance indicating that the components are well mixed and well dispersed. At the top end of the range, the material still maintains structural integrity.

The composition may also include an additive comprising at least one substance selected from the group consisting of an antioxidant, a pigment, and a lubricant.

In particular, these compositions are advantageous with the combination of properties achieved. The fluoroelastomer polymers are filled beyond what has been known to be done previously while maintaining mechanical integrity. With the high degree of inorganic filler/flame retardant, there are very low heat of combustion values of around 3000 Btu/lb for the flouropolymer compound. Because they are fluoropolymers the compounds are oil and fluid resistant, allowing them to be utilized in harsh environments.

These compositions are especially useful in cable applications where the transmission frequency across the cable is considerably less than 100 MHz. Some applications include appliance wire, aerospace/military wire, cable raceways, blown fiber tubes, fire alarm cables, circuit integrity cables, fiber optic distribution cables & breakout components, heat tracing cable jacket, stage lighting cable, industrial cable, shipboard cable (military & passenger), shielded cable jackets.

ILLUSTRATIVE EMBODIMENTS OF THE INVENTION

A non-dripping, flame retardant, flouropolymeric composition including a fluoropolymeric base polymer, at least one char forming agent and a compatibilizer agent is disclosed herein. The fluoropolymers used in the composition are those that are melt-fabricable, i.e. they are sufficiently flowable in the molten state that they can be fabricated by melt processing such as extrusion, to produce products having sufficient strength so as to be useful. The melt flow rate (MFR) of the fluoropolymers used in the present composition is relatively high, preferably at least about 10 g/10 min, as measured according to ASTM D-1238 at the temperature which is standard for the resin (see for example ASTM D 2116-91a and ASTM D 3307-93).

Examples of fluoropolymers that can be used in the composition include PVDF (polyvinylidene fluoride), ECTFE, poly-ethylene chlorotrifluoroethylene, and ETFE poly-ethylene tetrafluoroethylene. The fluoropolymer base includes in the range of about 33.3 to about 90 wt % of the composition.

The char forming agent is thermally stable at the melt processing temperature of the three-component composition, in the sense that it does not cause discoloration of the composition, which would indicate the presence of degradation product. The agent itself has color, typically white, which provides the color of the melt processed composition. In burn tests however, the formation of char indicates the presence of degradation.

The amount of char forming agent necessary to form sufficient char will depend on the agent, the particular fluoropolymer used, and its MFR. Some agents are more effective than others, whereby a relatively small amount will suffice for the composition (jacket) to pass certain burn tests. Generally, sufficient char can be obtained when the composition contains in the range of about 10 to about 66 wt % of the inorganic char forming agent. Examples of char-forming agents include zinc molybdate, calcium molybdate, and metal oxides such as ZnO, $Al_2O_3$, $TiO_2$, and $MgZnO_2$, although other char forming agents may also be utilized. Preferably the mean particle size of the char-forming agent is no greater than about 3 µm, and more preferably, no greater than about 1 µm, to provide the best physical properties for the composition.

Another example of inorganic char forming agent is ceramic microspheres, such as ZEEOSPHERES® ceramic microspheres available from the 3M company, which are understood to be alkali alumina silicates, which may have a larger mean particle size than about 3 µm, e.g. as large as about 5 µm, with smaller particle sizes, such as no greater than about 3 µm mean particle size being preferred. Preferably, the mean minimum particle size is at least about 0.05 µm; smaller particle sizes tend to embrittle the composition. In one embodiment of the present composition, the inorganic char forming agent comprises a plurality of char-forming agents. In another embodiment of the present composition, at least one of this plurality of char-forming agents is ceramic microspheres. A preferred composition comprises about 5 to about 20 wt % ceramic microspheres and about 20 to about 40 wt % of another char-forming agent, preferably ZnO, to constitute about 10 to about 60 wt % of the char-forming agent component of the composition.

The compatibilizer is used in an amount that is effective to provide the physical properties desired, namely promoting interfacial adhesion or interstitial bonding and a higher level of dispersion during mixing. However, the compatibilizer by itself does not provide the improved physical properties. Instead, the compatibilizer interacts with the char-forming agent and fluoropolymer to limit the reduction in tensile properties that the agent, if used by itself, would have on the fluoropolymer composition by improving elasticity and elongation, as shown in Table IV below. Without the presence of the compatibilizer, the melt blend of the fluoropolymer/char-forming agent tends to lack integrity, sometimes even forming a rough surface. With the compatibilizer being present, a uniform-appearing melt blend is obtained, in which the entire char-forming agent is incorporated into the melt blend. The effectiveness of the compatibilizer can be characterized by the tensile test specimen of the composition exhibiting an elongation of at least about 150%, preferably at least about 200%. The specimen also preferably exhibits a tensile strength of at least about 1500 psi (10.3 MPa). Preferably these properties are achieved on cable jacket specimens in accordance with ASTM D 3032 under the operating conditions of the tensile testing jaws being 2 in (5.1 cm) apart and moving apart at the rate of 20 in/min (51 cm/min).

The thermal stability of the compatibilizer is visualized from the appearance of the melt blend of the composition, that it is not discolored or foamed by degraded compatibilizer polymer. Since fluoropolymers melt at temperatures of at least about 165° C., the compatibilizer should be thermally stable at least up to this temperature and up to the higher melt processing temperature, which will depend on the melting temperature of the particular fluoropolymer being used and the residence time in melt processing. Such thermally stable polymers include homo-, co-, or ter-polymers, which can be semicrystalline or amorphous, and can contain aromatic groups either in the polymer chain or as pendant groups. Examples of such polymers include polyolefins such as the linear and branched polyethylenes, including high density polyethylene and thermoplastic elastomer such as those manufactured under the brand name Engages, polypropylene and Polymethylpentene, for example TPX® brand. Examples of the copolymers can include siloxane/polyetherimide block copolymer. Examples of aromatic compatibilizer polymers include Styrene-Ethylene-Butylene-Styrene Based Thermoplastic Elastomer—SEBS—such as those manufactured under the brand name KRATON®.

The compatibilizer should have a melting temperature or be melt flowable in the case of amorphous compatibilizer polymers so as to be melt-blendable with the other ingredients of the composition. The amount of compatibilizer necessary to provide beneficial effect in the composition will generally be about 0.1 to about 5 wt %, depending on the amount of char-forming agent that is present in the composition. Preferably the amount of such polymer present is about 0.5 to about 3 wt %, based on the total weight of fluoropolymer, char-forming agent and compatibilizer polymer.

The composition can be in the form of the physical mixture of the components or a melt blend thereof, and the melt blend can be in the form of the desired melt-fabricated article. The composition may also be dry as is required for melt fabrication, such as by extrusion. By "dry" is meant that the composition is not in the form of a dispersion or suspension in a liquid medium such as would be use for spray coating of a substrate.

The composition will typically be subjected to two melt-processing treatments. First, the composition is preferably melt blended, such as by using a twin-screw extruder or a BUSS KNEADER®. compounding machine, to form molding pellets, each containing all three ingredients of the composition. The molding pellets are a convenient form for feeding to melt processing equipment such as for extruding the composition into the fabricated article desired, such as jacket for twisted pair cables. The BUSS KNEADER®. machine operates by melting the polymer components of the composition and shearing the molten composition to obtain the incorporation of the char-forming agent into the fluoropolymer. The residence time of the composition in this type of melt processing equipment may be longer than the residence time in extrusion equipment. To avoid degradation, the BUSS KNEADER® machine is operated at the lowest temperature possible consistent with good blending, barely above the melting temperature of the fluoropolymer, while the extrusion temperature can be considerably higher, because of its shorter residence time. Other additives that do not contribute to flammability or smoke in the burn test, such as pigment, can also be compounded into the composition.

EXAMPLES

While this invention has been described by way of preferred embodiments which are intended to be illustrative in nature, the examples set out herein are not intended to limit the scope of the invention.

TABLE I

Range of Proportion of Ingredients Tested

| Ingredient | 1 PHR | 2 PHR | 3 PHR | 4 PHR | 5 PHR | 6 PHR |
|---|---|---|---|---|---|---|
| Polyvinylidene Fluoride | 100.0 | 100.0 | 100.0 | | | |
| Ethylene Tetrafluoroethylene Copolymer | | | | 100.0 | | |
| Ethylene Chlorotrifluoroethylene | | | | | 100.0 | 100.0 |
| Siloxane Polyetherimide block copolymer | 0.2-5.0 | 0.2-5.0 | 0.2-5.0 | 0.2-5.0 | | |
| Styrene Ethylene Butylene Copolymer | | | | | 0.2-5.0 | 0.2-5.0 |
| Zinc Oxide | 20-200 | 20-200 | 20-200 | 20-100 | 20-100 | 20-100 |
| Zinc Borate | 2-20 | | | | | |
| Calcium MetaBorate | | 2-20 | | | | |
| NanoClay | | | 2-20 | | | |
| Titanium Dioxide | 0.1-1 | 0.1-1 | 0.1-1 | 0.1-1 | 0.1-1 | 0.1-1 |

In the Examples below, the components are melt-blended together by the following general procedure: The fluoropolymer compositions are prepared using a 70 millimeter diameter BUSS KNEADER® continuous compounder and pelletizer. The BUSS KNEADER® machine utilized is a single reciprocating screw extruder with mixing pins along the barrel wall and slotted screw elements. The extruder is heated to temperatures sufficient to melt the polymers when conveyed along the screw. All ingredients are gravimetrically fed into the BUSS KNEADER® machine from one of the multiple feed ports along the barrel. The BUSS KNEADER® machine mixes all the ingredients into a homogeneous compound melt. The homogeneous compound melt is fed into a heated cross-head extruder and pelletized. The description of the compositions in terms of "parts" refers to parts by weight unless otherwise indicated.

The general procedure for forming a jacket of the melt blended composition involves extruding the blend as a jacket over a cable core, using the following extrusion conditions. The extruder has a 2.5 inch diameter barrel, 24:1 L/D, and is equipped with a metering type of screw having a compression ratio with respect to the barrel of about 2.5:1 as between the feed section of the screw and the metering section, i.e. the free volume, that is the volume in the extruder barrel that is unoccupied by the screw, wherein the screw flights in the feed section are about 2.5×the volume within the screw flights within the metering section. For a screw of constant pitch, the compression ratio is the ratio of the flight depth in the feed section to the flight depth in the metering section (metering into the crosshead). The application of heat to the extruder barrel starts with 400° F. (205° C.) in the feed section, increasing to 410° F. (210° C.) in the transition section and then to 420° F. (215° C.) in the metering section. The extruder is fitted with a crosshead. The assemblage of wires is fed though the cross-head and out the die tip of the crosshead. The temperature of the molten fluoropolymer at the die surrounding the die tip is 420° F. (215° C.). The outer diameter of the die tip is 0.483 in (12.3 mm) and the inner diameter of the die is 0.587 in (14.9 mm), with the annular space between the die tip and the I.D. of the die forming the annular space through which a molten tube of fluoropolymer is extruded and drawn down to coat the wire. No vacuum is used to draw the extruded tube down onto the core of twisted pairs insulated wires. The draw down ratio is 5:1, the thickness of the jacket being 10 mils (250 μm), and the draw ratio balance is 1.0. Draw ratio balance is the draw ratio of the molten polymer at the I.D. of the die vs. the draw ratio of the molten polymer at the die tip.

The present composition is further illustrated by preparing laboratory batches and investigating their physical, electrical, and combustion properties through testing methods. The following compositions were prepared by compounding mixtures of each formulation. The details of the specific components used in these compositions are summarized in the tables below. Where appropriate, the ASTM testing standard has also been indicated. In the examples below, a number of compositions are described, each containing fluoropolymer, char-forming agent, and compatibilizer, each forming test articles exhibiting good physical and electrical properties, and each capable of being extruded at a line speed exceeding 300 ft/min (91.5 m/min).

TABLE II

Examples 1-9

| Ingredient | 1 PHR (wt %) | 2 PHR (wt %) | 3 PHR (wt %) | 4 PHR (wt %) | 5 PHR (wt %) | 6 PHR (wt %) | 7 PHR (wt %) | 8 PHR (wt %) | 9 PHR (wt %) |
|---|---|---|---|---|---|---|---|---|---|
| Polyvinylidene Fluoride (SOLEF ® 31508/0003) | 100.0 (49.7) | 100.0 (49.7) | 100.0 (49.7) | 100.0 (49.8) | 100.0 (49.8) | 100.0 (49.8) | 100.0 (49.8) | 100.0 (49.8) | 100.0 (49.8) |
| Siloxane Polyetherimide Block Copolymer (SILTEM ® 1500) | 1.0 (0.5) | 1.0 (0.5) | 1.0 (0.5) | 1.0 (0.5) | | | | | |
| Styrene/Ethylene/Butylene/Styrene Block Copolymers (SEBS) (KRATON ® 1651G) | | | | | 1.0 (0.5) | | | | |
| Ethylene Octene Copolymer (ENGAGE ® 8130) | | | | | | 1.0 (0.5) | | | |
| High Density Polyethylene (HDPE 3364) | | | | | | | 1.0 (0.5) | | |
| Polymethyl Pentene (TPX ®) | | | | | | | | 1.0 (0.5) | |
| Fluoroelastomer (VITON ® B-600) | | | | | | | | | 1.0 (0.5) |
| Zinc Oxide (KADOX ® 930) | 95.0 (47.2) | 95.0 (47.2) | 95.0 (47.2) | 100.0 (49.8) | 100.0 (49.8) | 100.0 (49.8) | 100.0 (49.8) | 100.0 (49.8) | 100.0 (49.8) |
| Zinc Borate | 5.0 (2.5) | | | | | | | | |
| Calcium MetaBorate | | 5.0 (2.5) | | | | | | | |
| NanoClay | | | 5.0 (2.5) | | | | | | |
| Titanium Dioxide | 0.25 (0.1) | 0.25 (0.1) | 0.25 (0.1) | | | | | | |
| Total | 201.25 | 201.25 | 201.00 | 201.00 | 201.00 | 201.00 | 201.00 | 201.00 | 201.00 |
| Properties (ASTM Testing Standard) | | | | | | | | | |
| Extrusion Quality | Good | Good | Good | Good | Good | Good | Good | Good | Good |
| Specific Gravity (D792) | | | | | 2.678 | 2.658 | 2.68 | | 2.701 |
| Tensile Strength - Tape (20"/min), psi | | | | | 2280 | | | | |
| Elongation - Tape (20"/min), % | | | | | 111 | | | | |

TABLE II-continued

Examples 1-9

| Ingredient | 1 PHR (wt %) | 2 PHR (wt %) | 3 PHR (wt %) | 4 PHR (wt %) | 5 PHR (wt %) | 6 PHR (wt %) | 7 PHR (wt %) | 8 PHR (wt %) | 9 PHR (wt %) |
|---|---|---|---|---|---|---|---|---|---|
| Tensile Strength - Rod (20"/min), psi (D 412) | 2510 | 2645 | 2217 | 2578 | 2720 | | | | |
| Elongation - Rod (20"/min), % (D 412) | 321 | 391 | 185 | 320 | 25 | 30 | 20 | 20 | 85 |
| LTB, °C. (D 746) | −15.0 | −15.0 | −15.0 | −15.0 | | | | | |
| Dielectric Constant (D 150) | 4.9 | 4.9 | 5.1 | 4.9 | | | | | |
| Dissipation Factor (D 150) | 0.125 | 0.116 | 0.120 | 0.123 | | | | | |
| Volume Resistivity (D 257) | >10$^{15}$ | >10$^{15}$ | >10$^{15}$ | >10$^{15}$ | >10$^{15}$ | | | | |
| Oxygen Index, % (0.125") (D 2863) | 45.0 | 45.0 | 45.0 | 45.0 | 45.0 | | | | |
| Char Formation | Good | Excellent | Good | Excellent | Excellent | | | | |
| Heat of Combustion, BTU/lb | | 3040.0 | | 3040.0 | | | | | |

TABLE III

Examples 10-13

| Ingredient | 10 PHR | 11 PHR | 12 PHR | 13 PHR |
|---|---|---|---|---|
| Ethylene Tetrafluoroethylene Copolymer (TEFZEL ®) | 100.0 | 100.0 | | |
| Ethylene Chlorotrifluoroethylene (Halar ®) | | | 100.0 | 100.0 |
| Styrene Ethylene Butylene Copolymer (KRATON ® 1651G) | 1.0 | | 1.0 | |
| Siloxane Polyetherimide block copolymer (SILTEM ®) | | 1.0 | | 1.0 |
| Zinc Oxide (KADOX ® 930) | 66.7 | 66.7 | 50.0 | 66.7 |

| Properties | | | | ASTM Testing Standard |
|---|---|---|---|---|
| Buss Strand Quality | smooth | rough | smooth | smooth |
| Specific Gravity 0.125 in | 2.414 | | 2.196 | 2.312 | D 792 |
| TS - rod (20"/min) | 4240 | | 6024 | 5408 | D 412 |
| % E - rod (20"/min) | 297 | | 227 | 219 | D 412 |
| Flex Modulus | | | | | D 790 |
| Low Temperature Brittleness, C. | −54.0 | | >−5 | >−5 | D 746 |
| Oxygen Index, % (0.125") | 44.0 | | | | D 2863 |
| Initial Volume Resistivity, ohm*cm | 4*10$^{11}$ | | 1*10$^{10}$ | 2.1*10$^{10}$ | D 257 |
| Final Volume Resistivity, ohm*cm | 3*10$^{13}$ | | 3*10$^{10}$ | 2.7*10$^{10}$ | D 257 |
| LTB | −54.0 | | >−19 | >10 | D 746 |
| Dielectric Constant @ 100 MHz, Fresh | 3.57 | | 4.20 | 4.36 | D 150 |
| Dissipation Factor*10$^{-3}$ @100 MHz, Fresh | 0.128 | | 0.166 | 0.200 | D 150 |
| Dielectric Constant @ 100 MHz, Aged | 3.11 | | 3.34 | 3.32 | D 150 |
| Dissipation Factor*10$^{-3}$ @100 MHz, Aged | 0.016 | | 0.020 | 0.024 | D 150 |

In Example 1, the composition comprises 100.0 parts of PVDF, 1.0 part Siltem®, 95.0 parts Zinc Oxide, 0.25 part Titanium Dioxide and 5.0 parts Zinc Borate (mean particle size less than 1 μm), to total 201.25 parts by weight, is melt blended and then extruded. Tape samples (similar to cable jacketing) tested in accordance with ASTM D 412 (50.8 cm/min) exhibit a tensile strength of 2510 psi (17.3 MPa) and elongation of 321%. Test samples also exhibit good electrical and nonflammability properties, as follows: dielectric constant of 4.9 and dissipation factor of 0.125 (ASTM D 150) and a limiting oxygen index (LOI) of 45.0 (See Table II). The lower the dielectric constant, the better; generally a dielectric constant of no greater than 5.0 is considered satisfactory.

In Example 1, the composition comprises 100.0 parts of PVDF, 1.0 part SILTEM®, 95.0 parts Zinc Oxide, 0.25 part Titanium Dioxide and 5.0 parts Zinc Borate (mean particle size less than 1 µm), to total 201.25 parts by weight, is melt blended and then extruded. Tape samples (similar to cable jacketing) tested in accordance with ASTM D 412 (50.8 cm/min) exhibit a tensile strength of 2510 psi (17.3 MPa) and elongation of 321%. Test samples also exhibit good electrical and nonflammability properties, as follows: dielectric constant of 4.9 and dissipation factor of 0.125 (ASTM D 150) and a limiting oxygen index (LOI) of 45.0 (See Table II). The lower the dielectric constant, the better; generally a dielectric constant of no greater than 5.0 is considered satisfactory.

In Example 2, the composition comprises 100.0 parts of PVDF, 1.0 part SILTEM®, and 95.0 parts Zinc Oxide, 0.25 part Titanium Dioxide and 5.0 parts Calcium MetaBorate (mean particle size less than 1 µm), to total 201.25 parts by weight, is melt blended and then extruded. Tape samples (similar to cable jacketing) tested in accordance with ASTM D 412 (50.8 cm/mm) exhibit a tensile strength of 2645 psi (18.23 MPa) and elongation of 391%. Test samples also exhibit good electrical and nonflammability properties, as follows: dielectric constant of 4.9 and dissipation factor of 0.116 (ASTM D 150) and a limiting oxygen index (LOI) of 45.0 (see Table II).

In Example 3, the composition comprises 100.0 parts of PVDF, 1.0 part SILTEM®, and 95.0 parts Zinc Oxide, 0.25 part Titanium Dioxide and 5.0 parts Closite NA+ (mean particle size less than 1 µm), to total 201.25 parts by weight is melt blended and extruded to give good extrudate having satisfactory tensile strength and elongation.

In Example 4, the composition comprises 100.0 parts of PVDF, 1.0 part SILTEM®, and 100.0 parts Zinc Oxide (mean particle size less than 1 µm), to total 201.00 parts by weight is melt blended and extruded to give good extrudate having satisfactory tensile strength and elongation.

In Example 5, the composition comprises 100.0 parts of PVDF, 1.0 part KRATON®, and 100.0 parts Zinc Oxide (mean particle size less than 1 µm), to total 201.00 parts by weight is melt blended and extruded to give good extrudate having unsatisfactory elongation (see Table II).

In Example 6, the composition comprises 100.0 parts of PVDF, 1.0 part ENGAGE®, and 100.0 parts Zinc Oxide (mean particle size less than 1 µpm), to total 201.00 parts by weight is melt blended and extruded to give good extrudate having unsatisfactory elongation (see Table II).

In Example 8, the composition comprises 100.0 parts of PVDF, 1.0 part TPX®, and 100.0 parts Zinc Oxide (mean particle size less than 1 µm), to total 201.00 parts by weight is melt blended and extruded to give good extrudate having unsatisfactory elongation (see Table II).

In Example 9, the composition comprises 100.0 parts of PVDF, 1.0 part Viton® B-600, and 100.0 parts Zinc Oxide (mean particle size less than 1 µm), to total 201.00 parts by weight is melt blended and extruded to give good extrudate having unsatisfactory elongation (see Table II).

In Example 9, the composition comprises 100.0 parts of PVDF, 1.0 part VITON® B-600, and 100.0 parts Zinc Oxide (mean particle size less than 1 µm), to total 201.00 parts by weight is melt blended and extruded to give good extrudate having unsatisfactory elongation (see Table II).

In Example 10, the composition comprises 100.0 parts of ETFE, 1.0 part KRATON®, and 66.7 parts Zinc Oxide, to total 167.7 parts by weight, is melt blended and extruded to give good extrudate and its test samples exhibit tensile strength of 4240 psi (29.23 MPa), elongation of 297% (see Table III).

In Example 11, the composition comprises 100.0 parts of ETFE, 1.0 part SILTEM®, and 66.7 parts Zinc Oxide, to total 167.7 parts by weight, is melt blended and the resulting extrudate was rough and unsuitable for further testing (see Table III).

In Example 12, the composition comprises 100.0 parts of ECTFE, 1.0 part KRATON®, and 50.0 parts Zinc Oxide, to total 151.0 parts by weight, is melt blended and extruded to give good extrudate and its test samples exhibit tensile strength of 6024 psi (41.5 MPa), elongation of 227% (see Table III).

In Example 13, the composition comprises 100.0 parts of ECTFE, 1.0 part SILTEM®, and 66.7 parts Zinc Oxide, to total 167.7 parts by weight, is melt blended and extruded to give good extrudate and its test samples exhibit tensile strength of 5408 psi (37.3 MPa), elongation of 219% (see Table III).

TABLE IV

| | Elongation Comparison | |
|---|---|---|
| Base polymer | Elongation Without Compatibilizer | Elongation With Compatibilizer |
| PVDF | 15 | 391 |
| ETFE | 20 | 297 |
| ECTFE | 20 | 220 |

In the case of the fluoropolymers tested, generally copolymers seem to work best as compatibilizers. However, it seems that not all compatibilizers were effective with all of the fluoropolymers. For example, in the case of PVDF used as a base polymer, the most effective compatibilizer appears to be Siloxane Polyetherimide block copolymer commonly available under the trade name Siltem®. This is demonstrated in the results shown above in Table II, Examples 1-9.

In the case of the fluoropolymers tested, generally copolymers seem to work best as compatibilizers. However, it seems that not all compatibilizers were effective with all of the fluoropolymers. For example, in the case of PVDF used as a base polymer, the most effective compatibilizer appears to be Siloxane Polyetherimide block copolymer commonly available under the trade name SILTEM®. This is demonstrated in the results shown above in Table II, Examples 1-9.

In contrast, with ETFE as the base polymer, the preferred polymer is the thermoplastic elastomer Styrene Ethylene Butylene Copolymer, which is a block copolymer of olefin units and units containing an aromatic group, commonly available under the trade name KRATON® thermoplastic elastomer. Most preferred are the KRATON® G1651 and G1652 that are styrene/ethylene/butylene/styrene block copolymers containing at least 25 wt % styrene-derived units. In the case of ECTFE, both KRATON® and SILTEM® seem to be equally effective as shown in Table III.

The greatly reduced gas generation of the composition enhances safety for occupants and fire fighters in a building subjected to fire and containing cable jacketed with the composition by greatly reducing obscuration caused by smoke and the possibility of debilitating irritancy also caused by the smoke. The reduced acid gas generation and reduced acidity of the jacket composition also leads to less corrosion of sensitive equipment in the vicinity of the fire.

While particular elements, embodiments and applications of the present invention have been shown and described, it will be understood, of course, that the invention is not limited thereto since modifications may be made by those skilled in the art, particularly in light of the foregoing teachings.

What is claimed:

1. A non-dripping, flame retardant, fluoropolymeric composition comprising: (a) a fluoropolymeric base polymer comprising polyvinylidene fluoride (PVDF); (b) at least one char forming agent; and (c) a compatibilizer comprising siloxane polyetherimide copolymer, wherein said fluoropolymeric base polymer comprises about 33.3 to about 90 wt % of the total composition.

2. The composition of claim 1 further comprising antioxidants.

3. The composition of claim 1 further comprising lubricant.

4. A non-dripping, flame retardant, fluoropolymeric composition comprising: (a) a fluoropolymeric base polymer comprising ethylene tetrafluoroethylene copolymer (ETFE); (b) at least one char forming agent; and (c) a compatibilizer comprising styrene ethylene butylene styrene copolymer, wherein said fluoropolymeric base polymer comprises about 33.3 to about 90 wt % of the total composition.

5. The composition of claim 4 further comprising antioxidants.

6. The composition of claim 4 further comprising lubricant.

7. A non-dripping, flame retardant, fluoropolymeric composition comprising: (a) a fluoropolymeric base polymer comprising ethylene chlorotrifluoroethylene copolymer (ECTFE); (b) at least one char forming agent; and (c) a compatibilizer comprising a compound selected from the group consisting of siloxane polyetherimide copolymer and styrene ethylene butylene styrene copolymer.

8. The composition of claim 7 wherein said at least one char forming agent is selected from the group consisting of metal hydrates, silicon oxides, metal oxides, carbonates, talcs, clays, nanoclays, molybdates, borates, calcium metaborate, stannates, carbon blacks, silicates, and phosphates.

9. The composition of claim 8, wherein said at least one char forming agent mean particle size is no greater than about 5 μm.

10. The composition of claim 9, wherein said at least one char forming agent mean particle size is from about 0.05 μm to about 3 μm.

11. The composition of claim 7, wherein said at least one char forming agent comprises a plurality of char forming agents.

12. The composition of claim 11, wherein at least one of said plurality of char forming agents is ceramic microspheres.

13. The composition of claim 7, wherein said compatibilizer is styrene ethylene butylene styrene copolymer comprising at least about 25 wt % styrene-derived units.

14. The composition of claim 7 wherein said fluoropolymeric base polymer comprises about 33.3 to about 90 wt % of the total composition.

15. The composition of claim 7, wherein the char forming agent comprises about 10 to about 66.6 wt % of the total composition.

16. The composition of claim 7, wherein said compatibilizer comprises about 0.1 to about 5 wt % of the total composition.

17. The composition of claim 7 further comprising antioxidants.

18. The composition of claim 7 further comprising pigments.

19. The composition of claim 7 further comprising lubricant.

* * * * *

UNITED STATES PATENT AND TRADEMARK OFFICE
CERTIFICATE OF CORRECTION

PATENT NO. : 7,625,974 B2  Page 1 of 1
APPLICATION NO. : 11/540182
DATED : December 1, 2009
INVENTOR(S) : Jozokos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 117 days.

Signed and Sealed this

Second Day of November, 2010

David J. Kappos
*Director of the United States Patent and Trademark Office*